Figure 1:
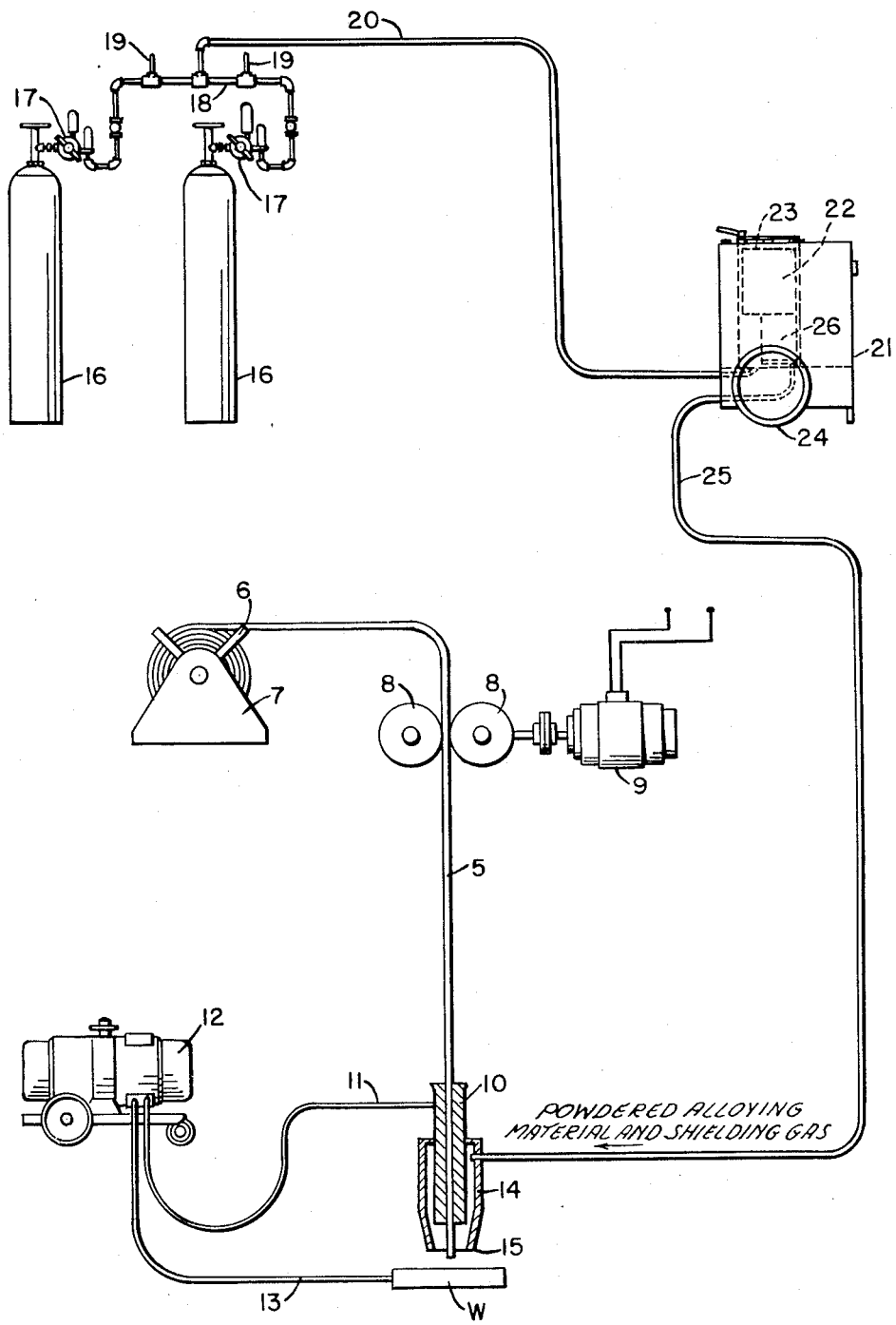

Dec. 13, 1955     A. MULLER     2,727,125
ELECTRIC ARC WELDING

Filed July 1, 1952     2 Sheets-Sheet 1

INVENTOR
ALBERT MULLER
BY
H. Hume Mathews
ATTORNEY

Dec. 13, 1955   A. MULLER   2,727,125
ELECTRIC ARC WELDING

Filed July 1, 1952   2 Sheets-Sheet 2

INVENTOR
ALBERT MULLER
ATTORNEY

United States Patent Office 2,727,125
Patented Dec. 13, 1955.

2,727,125

ELECTRIC ARC WELDING

Albert Muller, Plainfield, N. J., assignor to Air Reduction Company, Incorporated, a corporation of New York Application July 1, 1952, Serial No. 296,557

3 Claims. (Cl. 219—10)

This invention relates to electric arc welding and particularly to a method of and apparatus for depositing a finely divided solid, such as finely divided alloying elements with the metal forming the weld. This application is a continuation-in-part of my co-pending application Serial No. 174,989, filed July 20, 1950, now abandoned, which application is a continuation of my application Serial No. 55,381, filed October 19, 1948, now abandoned.

It is frequently desirable in welding metals to include in the weld metal more than one metallic element, i. e., to form an alloy weld deposit, for the purpose of materially strengthening or otherwise improving the weld. This has been accomplished, heretofore, by the provision of special welding rods containing the desired elements in the form of alloys with the metal of the rods, or in the form of metals and ferro-alloys included in coatings on the rods. While the use of such special welding rods is often satisfactory, it is subject to certain disadvantages such as the necessity of preparing and storing adequate supplies of rods of varying compositions. Each type of rod is useful for the deposition of only one analysis of weld metal. Moreover, it is sometimes difficult to prepare rods containing certain constituents which, in appreciable percentage, make the metal hard and difficult to draw and/or make it difficult or impossible to wind on a reel as a continuous length of electrode. Similarly, where alloying elements are added as ingredients in a coating applied to the rod it is impossible to coil and uncoil the rod without cracking of the coating. Furthermore, coated rods in continuous length are not suitable for use as arc welding electrodes because of the difficulty of introducing the arc current to the electrode through the coating. It is, therefore, often impossible to provide rods of compositions suitable for the accomplishment of the desired purpose. It has been proposed to feed alloying materials through a hollow electrode to a submerged welding arc, maintained under a flux blanket. But such a submerged arc hollow elecrode process involves reactions between the alloying metal and the flux and has the disadvantage (in addition to being done blind, i. e., arc and weld invisible) of being limited to short lengths of electrode. Continuous coiled hollow electrodes cannot be used because with such an electrode there is no way of continuously and adjustably introducing the alloying material to the weld. Furthermore, hollow electrodes are costly to make and are impractical for use as continuous coiled lengths.

It is an object of the present invention to provide a simple and effective method and apparatus whereby materials such as alloying constituents can be introduced readily to a continuous consuming electrode welding arc in the necessary proportions to afford desired characteristics in the finished weld.

The invention involves the introduction of materials in solid form to the gas shielded welding arc during the welding operation.

The invention involves more specifically the introduction of metallic alloying material to the inert gas shielded consumable electrode metal welding arc during the welding operation. This metallic alloying material is in powdered or granular form, entrained or suspended in an inert gaseous medium, which medium is delivered to or about the arc to shield the arc end of the electrode, the arc, and the molten metal formed thereby from the ambient atmosphere. As a result of the operation, improved welds with alloying constituents can be produced and the consumable electrodes can be made more simply and cheaply and in a smaller number of types.

The materials most commonly used for alloying purposes include the ferro-alloys of manganese, chromium, molybdenum, vanadium, and the like, as well as metals such as nickel and aluminum. These elements are generally characterized by their ability to improve the hardness and strength of the weld metal when alloyed therewith. Certain constituents such as titanium and columbium are also used extensively in the welding of stainless steels to stabilize the weld metal i. e., to combine with the carbon, and prevent the formation of chromium carbide which if formed, reduces locally the chromium content and results in lowering of the corrosion-resistant properties of the steel. All of the above materials and numerous others may be introduced into the weld in the manner hereinbefore indicated, and improved results in the welding operation can thereby be effected.

Figure 2:
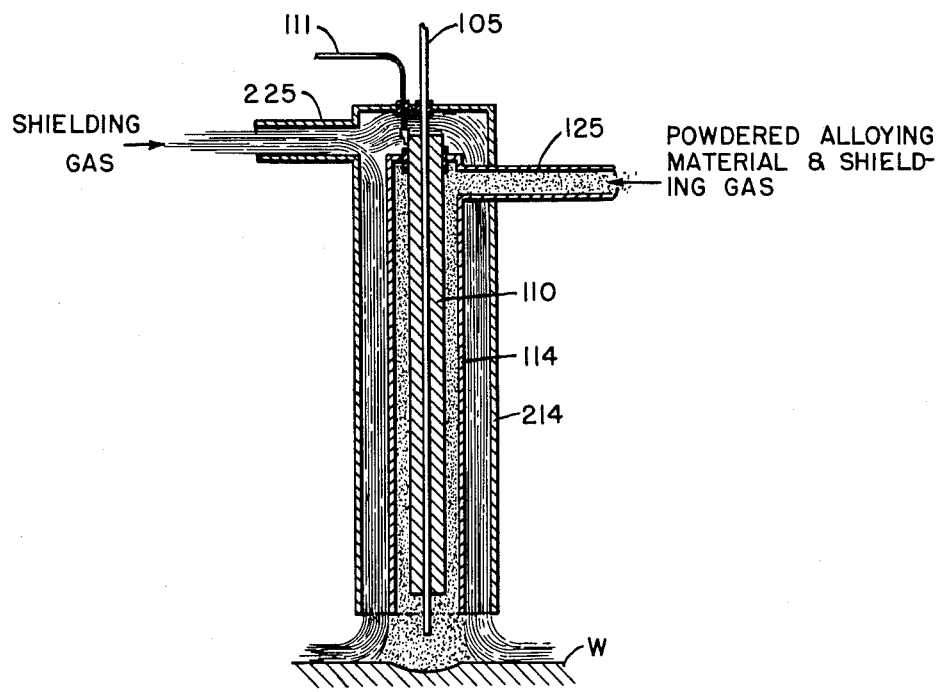

In the accompanying drawing, Figure 1 illustrates schematically apparatus suitable for the practice of the present invention. Figure 2 illustrates a modified form of a portion of the apparatus of Figure 1.

Referring to the drawing, 5 indicates a bare consumable electrode which is delivered from a reel 6 supported in a frame 7 by means of rolls 8 which are driven by a motor 9. Thus the electrode can be supplied at any desired rate under the control of the operator. The electrode passes through the current pickup shoe 10, which is connected by a conductor 11, to one output terminal of a source of electric current such as a welding machine 12. The other output terminal of the welding machine is connected by a conductor 13 to the workpiece W. Thus, as the electrode 5 is supplied continuously, an arc is maintained between the end of the electrode and the workpiece W and the electrode is continuously melted and the metal is delivered to the weld. Surrounding the current pickup shoe 10 is a casing 14, terminating in a nozzle 15 adjacent to the end of the electrode 5. An inert shielding gas, preferably argon or helium, or a mixture of such gases, is provided, for example, in cylinders 16 which are connected through pressure reducing vlaves 17 to a manifold 18. Flow meters 19 are provided to permit control of the rate of flow of gas through the manifold 18 to a pipe 20.

The gas is delivered by the pipe 20 to an apparatus 21 which may be of any suitable construction adapted to feed a finely divided solid material to the stream of gas. The details of such an apparatus form no part of the present invention and consequently need not be described. A suitable apparatus of this type is disclosed in Patent No. 2,549,033, issued April 17, 1951, to Joseph M. Tyrner. Essentially such an apparatus consists of a chamber 22 adapted to receive a supply of the finely divided material. The chamber is closed by a cover 23. The material from the chamber 22 is fed to a table 24, and sifted therefrom into a pipe 25. A motor 26 is adapted to operate the apparatus, which provides a uniform and regulated flow of the finely divided material into the gas stream flowing through the pipe 25 which is connected to the casing 14. Thus the operator may regulate the flow of the finely divided alloying elements into the gas stream, thereby supplying the desired amount of the element to the arc and ensuring the introduction of the alloying element in the desired proportion to the weld.

One application of the present invention is in the formation of a weld deposit of aluminum bronze, an alloy of copper and aluminum. Such an alloy may contain up to 20% or more of aluminum by weight, the balance copper or copper with a small percentage of iron. When the aluminum content is from 9% to 20% by weight of the total alloy, the alloy has excellent strength and wear resistance properties, and aluminum-bronze welding is desirable for many commercial applications.

Serious practical difficulties have been encountered in the preparation of suitable welding rods of aluminum-bronze alloy. If more than 9% aluminum is alloyed with the copper, it is almost impossible to work the metal to provide welding rods of the various sizes required for commercial welding operations. These higher alloy aluminum-bronzes are so difficult to work that it is necessary to resort to a complicated annealing and swaging operation which makes the cost of producing the alloy rods almost prohibitive. In addition, such rods cannot be wound on reels in long lengths and withdrawn therefrom by a welding machine.

By utilizing the present invention an entirely satisfactory homogeneous aluminum-bronze weld deposit can be made with a plain copper welding rod, which is soft and ductile and easily formed and handled, as the electrode in an inert gas shielded consuming electrode metal arc welding process as described above, and suspending in the shielding gas finely divided metallic aluminum which alloys with the copper deposited by the electrode to form the hard aluminum-bronze weld deposit.

Using a 1/16-inch diameter copper electrode, satisfactory results can be obtained if the electrode is fed to the arc at a rate of 220 inches per minute with a welding current of 310 amperes direct current reverse polarity and an arc voltage of 28.5 volts. Argon may be used as the shielding gas at a flow rate of 60 cubic feet per hour through a 3/4-inch diameter nozzle exit orifice. The powdered aluminum is fed from the powder dispenser into the shielding gas stream at a rate of about 2.0 pounds per hour. This results in an aluminum-bronze weld deposit of approximately 12% by weight aluminum which has a Brinell Hardness Number 240 using a 3,000 kg. load.

While good weld deposits can be obtained with the method and apparatus described above, some of the alloying material carried in the gas stream may not be alloyed in the weld metal, but rather, may deposit outside the confines of the weld puddle and be lost. Not only does this result in some waste of material, but in some circumstances it is difficult to maintain sufficient control over the process if an indeterminate amount of the alloying material is lost. To circumvent this difficulty the modified apparatus of Figure 2 is useful. It consists of concentric shielding gas barrels surrounding a contact tube through which the electrode wire passes, the purpose of the construction being to subdivide the shielding gas stream into two parts. Solid material in finely divided form is carried to the arc only by the portion of the shielding gas passing through the inner barrel, which confines the material to the area immediately adjacent to the electrode, and assures substantially complete recovery of the material in the weld. That apparatus of Figure 2, which may be used as a substitute for the welding head represented in Figure 1 by the component parts designated 10, 14, and 15, consists of a contact tube 110, which is electrically connected to the welding machine by conductor 111, and two surrounding concentric shielding gas casings designated 114 and 214 respectively. Casing 114 is preferably slightly smaller in diameter than the weld puddle. The electrode wire 105 is fed through the contact tube 110 to the arc which is maintained between the end of electrode 105 and work W. Shielding gas carrying suspended material such as alloying material is supplied to the inner casing 114 from conduit 125. Shielding gas containing no suspended material is supplied to the outer casing 214 from conduit 225.

Employing apparatus of the type described immediately above, a stabilized stainless steel weld deposit, can be produced using an unstabilized stainless steel electrode wire and adding titanium, preferably in the form of ferro-titanium, as a pulverulent material suspended in the shielding gas. For example, a 1/16-inch diameter type 308 stainless steel electrode wire may be employed with a welding current of 320 amperes and an arc voltage of 24 volts and the wire fed to the arc at a rate of 210 inches per minute. Type 308 stainless steel comprises approximately .14% C. 18% Cr, and 9% Ni. Argon may be used as the shielding gas in a welding head of the type disclosed in Figure 2 with about 44 cubic feet per hour flowing through a 1-inch diameter outer barrel and about 16 cubic feet per hour flowing through the 1/2-inch diameter inner barrel. The gas which flows in the concentric barrels should be adjusted so the issuing gas streams in effect constitute a single stream. Ferro-titanium, in the form of a dry finely-divided solid, is suspended in the gas flowing through the inner barrel. For the above conditions ferro-titanium should be added at a rate of about .35 pound per hour. This results in a weld deposit containing about .7% titanium and having the approximate analysis of type 347T titanium stabilized stainless steel.

Another example of where the present invention is useful is in the welding of titanium. Titanium is available in commercially pure form and has an ultimate tensile strength in that form of from 75,000 to 100,000 pounds per square inch. Because of the difficulties and expense involved in procuring special high-strength titanium alloys as welding electrode wires, it is desirable to be able to produce such high strength weld metal from the relatively low strength available welding wire. Such a high strength alloy is titanium alloyed with 3% chromium and 1.5% iron, which has an ultimate tensile strength of from 200,000 to 225,000 pounds per square inch. This alloy may be produced as weld metal by using a commercially pure titanium wire as the welding electrode and by supplying ferro-chromium as the alloying material suspended in the shielding gas stream. Using a 1/16-inch diameter 75A titanium wire as the welding electrode in an argon shield, with a welding current of 320 amperes at reverse polarity and an arc voltage of 29 volts, a good weld can be made with a wire feed speed of 400 inches per minute and a weld travel speed of 15 inches per minute. If powdered ferro-chromium having a chromium to iron ratio of 2 to 1 is fed to the shielding gas stream at a rate of about .55 pound per hour, a high strength deposit containing approximately 3% chromium and 1.5% iron results.

Because in the present invention the addition material is suspended in the shielding gas stream and does not depend on gravity, all position welding is possible.

Because the shielding gas may be monatomic inert gas, highly reactive elements such as titanium can be used. Not only does titanium have to be protected from oxidation, but in addition, it has to be protected from reaction with nitrogen, the major constituent of the air, and an element in which titanium burns above 800° C. to form titanium nitride.

The specific embodiments of the invention described above are given by way of illustration. It is to be understood that the invention may be used in other ways without departing from its spirit and scope as defined by the following claims.

I claim:

1. A method of forming an alloy weld deposit of predetermined composition which comprises establishing an electric welding arc between the end of a bare consumable wire electrode and a work-piece, feeding the electrode toward the work at a rate to maintain the arc as metal is transferred across the arc from the electrode to the work, shielding the arc end of the electrode, the arc, and the weld deposit with a subdivided flowing stream of inert monatomic gas, entraining an alloying metal in pulverulent form in a subdivision of the shielding gas stream adjacent the electrode to carry the alloying material into contact with the molten weld metal transferred across the arc, and independently controlling the rate of feed of the alloying material into the shielding gas stream relative to the rate of feed of the wire electrode.

2. Apparatus for gas-shielded electric arc welding with a bare wire consuming electrode comprising means for feeding a subdivided stream of shielding gas in the direction of the electrode and surrounding the electrode to shield the electrode, the arc, and the molten weld metal from the ambient atmosphere, one of said shielding gas stream subdivisions being adjacent the electrode, and means for introducing pulverulent alloying metal into a subdivision of the shielding gas stream adjacent the electrode.

3. A gas shielded arc welding method comprising establishing an arc from a bare consuming wire electrode to a workpiece, feeding said electrode toward said workpiece to maintain said arc as metal is transferred across said arc from said electrode to said workpiece, shielding said arc with an inner stream of shielding gas containing a finely divided solid suspended therein, and surrounding said inner gas stream with an outer annular stream of shielding gas to confine said inner stream and bring the solid contained in said inner stream in intimate contact with the weld puddle formed by said arc.

References Cited in the file of this patent

UNITED STATES PATENTS

| | | |
|---|---|---|
| 1,161,366 | Wohlrab | Nov. 23, 1915 |
| 2,083,309 | Applegate | June 8, 1937 |
| 2,151,914 | Hopkins | Mar. 28, 1939 |
| 2,504,868 | Muller | Apr. 18, 1950 |
| 2,592,414 | Gibson | Apr. 8, 1952 |

FOREIGN PATENTS

| | | |
|---|---|---|
| 82,917 | Switzerland | Nov. 1, 1919 |
| 143,331 | Great Britain | May 27, 1920 |
| 495,299 | Great Britain | Nov. 10, 1938 |
| 546,961 | Great Britain | Aug. 7, 1942 |